United States Patent
Johnson et al.

(10) Patent No.: US 10,217,132 B1
(45) Date of Patent: *Feb. 26, 2019

(54) CONTENT EVALUATION BASED ON USERS BROWSING HISTORY

(71) Applicant: Google LLC, Mountain View, CA (US)

(72) Inventors: Nicholas Johnson, Palo Alto, CA (US); Dong Lin, Mountain View, CA (US); Shankar R. Ponnekanti, Mountain view, CA (US)

(73) Assignee: Google LLC, Mountain View, CA (US)

( * ) Notice: Subject to any disclaimer, the term of this patent is extended or adjusted under 35 U.S.C. 154(b) by 559 days.

This patent is subject to a terminal disclaimer.

(21) Appl. No.: 14/864,380

(22) Filed: Sep. 24, 2015

Related U.S. Application Data

(63) Continuation of application No. 13/525,631, filed on Jun. 18, 2012, now Pat. No. 9,159,083.

(51) Int. Cl.
*G06Q 30/06* (2012.01)
*G06Q 30/08* (2012.01)
*G06Q 30/02* (2012.01)

(52) U.S. Cl.
CPC ..... *G06Q 30/0255* (2013.01); *G06Q 30/0275* (2013.01); *G06Q 30/06* (2013.01); *G06Q 30/08* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| | | | |
|---|---|---|---|
| 7,370,002 B2 | 5/2008 | Heckerman et al. | |
| 2009/0006363 A1 | 1/2009 | Canny et al. | |
| 2009/0063278 A1 | 3/2009 | Song et al. | |
| 2009/0327032 A1* | 12/2009 | Gunawardana .... | G06Q 30/0243 705/14.42 |

OTHER PUBLICATIONS

Gu, Siyu, et al.; "What Are Driving Users to Click Ads? User Habit, Attitude and Commercial Intention"; ADKDD'10; Jul. 25, 2010, © 2010, 9 pages.
Reznichenko, Alexey et al.; "Auctions in Private Internet Advertising"; Max Planck Institute for Software Systems/Microsoft Research; © 2011, 10 pages.

\* cited by examiner

*Primary Examiner* — Ming Shui
(74) *Attorney, Agent, or Firm* — Fish & Richardson P.C.

(57) ABSTRACT

A computerized method and apparatus for evaluating content on a computer network. The method includes obtaining a quality score of content configured for display with a web page, wherein the quality score is based at least in part on keywords associated with the content and either a search query or metadata associated with the web page. The method also includes identifying a user metric of a computing device associated with the search query or the metadata. The method further includes generating an adjusted quality score of the content based on the quality score and the user metric. The method also includes selecting a parameter for an auction based on the adjusted quality score, wherein the parameter indicates a relation between a bid value based auction and a content quality based auction.

18 Claims, 6 Drawing Sheets

CONTENT EVALUATION BASED ON USERS BROWSING HISTORY

CROSS-REFERENCE TO RELATED APPLICATIONS

This application is a continuation application of and claims priority to U.S. application Ser. No. 13/525,631, filed on Jun. 18, 2012, the entire contents of which are hereby incorporated by reference.

BACKGROUND OF THE INVENTION

The present disclosure relates generally to online advertisements. In particular, the present disclosure relates to determining which candidate advertisements to show to an online user, based in part on the user's browsing history.

One way online companies make money is by either offering items for purchase as online content such as online advertisements, or by offering a portion of their web site to content and receiving a monetary renumeration whenever an online users clicks on content impressed on their web site (called cost-per-click).

SUMMARY OF THE INVENTION

Implementations of the systems and methods for performing quality score adjustment are described herein. One implementation is a computerized method for evaluating content on a computer network. The method includes obtaining, by a data processing system, a quality score of content configured for display with a web page, wherein the quality score is based at least in part on keywords associated with the content and at least on one of a term of a search query and metadata associated with the web page. The method also includes identifying a user metric of a computing device associated with the at least one of the search query and the metadata associated with the web page. The method further includes generating an adjusted quality score of the content based on the quality score and the user metric. The method still further includes selecting a parameter for an auction based on the adjusted quality score, wherein the parameter indicates a relation between a bid value based auction and a content quality based auction.

Another implementation is a computer readable storage medium storing a computer program product which, when executed by a computer, causes the computer to perform the function of obtaining a quality score of content configured for display with a web page. The quality score can be based at least in part on keywords associated with the content and at least on one of a term of a search query and metadata associated with the web page. The computer program product can also cause the computer to perform the functions of identifying a user metric of a computing device associated with the at least one of the search query and the metadata associated with the web page, and generating an adjusted quality score of the content based on the quality score and the user metric. The computer program product can also cause the computer to perform the function of selecting a parameter for an auction based on the adjusted quality score. The parameter indicates a relation between a bid value based auction and a content quality based auction.

Yet another implementation is a data processing system that includes an obtaining unit configured to obtain a quality score of content configured for display with a web page, wherein the quality score is based at least in part on keywords associated with the content and on at least one of a term of a search query and metadata associated with the web page. The data processing system also includes an identifying unit configured to identify a user metric of a computing device associated with the at least one of the search query and the metadata associated with the web page. The data processing system further includes a generating unit configured to generate an adjusted quality score of the content based on the quality score and the user metric. The data processing system still further includes a selecting unit configured to select a parameter for an auction based on the adjusted quality score, wherein the parameter indicates a relation between a bid value based auction and a content quality based auction.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Configurations of the present invention may be implemented as software stored on computer readable storage media for causing a computer to implement the software. The computer may have a hard drive, system memory, a microprocessor, and network connectivity hardware. In a similar manner, an implementation of the present invention may be implemented via a series of steps or processes executed by a computer via the microprocessors executing instructions stored in system memory. The present invention may also be embodied as a specially-designed computer which contains the software in memory and implements the instructions required by the software.

Figure 1:
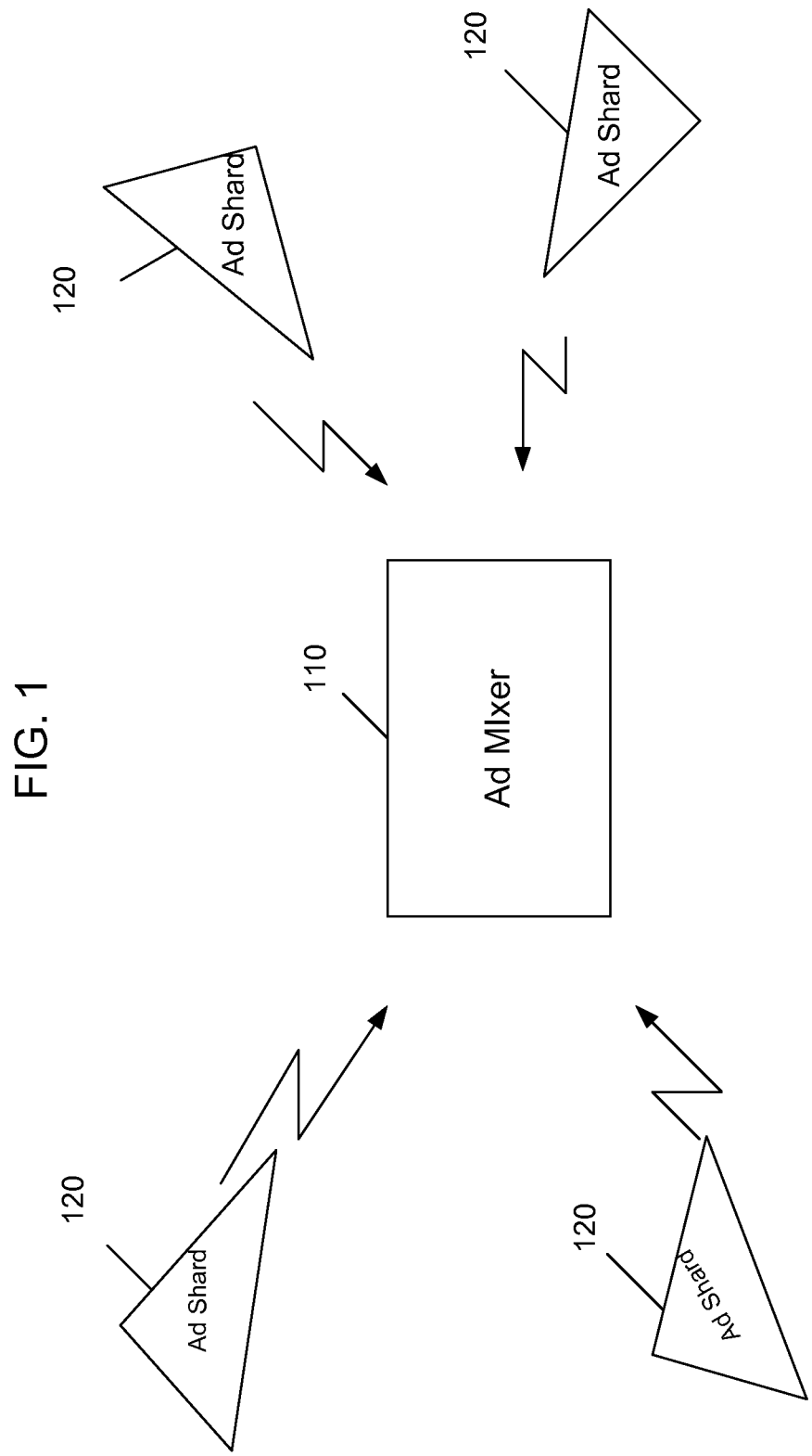
FIG. 1 is a block diagram showing a relationship between ad shards and an ad mixer, in accordance with an illustrative implementation.

Advertisers can provide candidate advertisements for consideration in online advertisement actions to online advertisement auction sites. FIG. 1 shows a plurality of ad shards 120 that store candidate advertisements from advertisers, in which keywords associated with each candidate advertisement are stored along with the advertisements themselves in the ad shards 120. When an online user performs a particular online function, such as requesting an online search, keywords entered by the user for that online search are provided to an ad mixer 110, which determines which advertisements to show, or impress, to the user along with the results of the keyword search (e.g., the most relevant web sites associated with the keyword search terms). The results of the keyword search can be determined based on metadata associated with web sites as matched to the keyword search words input by the user as part of an online search. This can be used as a factor in determining which candidate ads win an online auction and which ads lose an online auction, which is also referred to as quality score.

An online user can visit a web site of a publisher, such as a web page that allocates space for online ads (e.g., the right-most 25% of the web page display). This event may trigger an online advertisement auction to take place, in which metadata associated with the purchaser's web site can be compared to keywords associated with candidate ads stored in the ad shards 120. The ads that are the most relevant can be impressed to the user on the purchaser's web page. For example, a sportswear web site may have metadata corresponding to: jerseys, uniforms, tennis shoes, etc.

Apart for the relevance of the online ads to the keyword search terms of an online search or the metadata of a purchaser's web site being visited by a user, a second monetary bid factor that is utilized by the ad mixer 110 is the cost-per-click assigned by each advertiser for that advertiser's candidate ads stored in the ad shards 120. Thus, if a first candidate ad has a cost-per-click of 10 cents, which corresponds to the price that the advertiser agrees to pay the advertisement auction web site (with a portion of those costs going to the purchaser on which the advertisement is actually impressed), and a second candidate ad has a cost-per-click of 8 cents, it is possible that the first candidate ad may have a higher auction rating and win the advertisement auction even it it's associated keywords are not as close to the keywords associated with the online keyword search or the metadata associated with a purchaser's web site. This is because revenue is an important consideration for online auctions, and so advertisers have to carefully choose the amount of money they are willing to pay to have their advertisements shown to online users.

Thus, for each advertisement that is to be performed by the ad mixer 110, the first "quality score" factor and the second "monetary bid" factor are taken into consideration. The use of these two factors is an important element in determining which ads win auctions and which ads lose auctions. By way of example, an ad may win an auction if it is one of the top five (5) ads having a combined relevance/cost factor, given that there is room for five ads to be shown to the online user on a particular online display (e.g., on the top portion and the right side portion of a display that also shows the most relevant web sites matching keywords entered by a user for an online search requested by the user).

Figure 2:
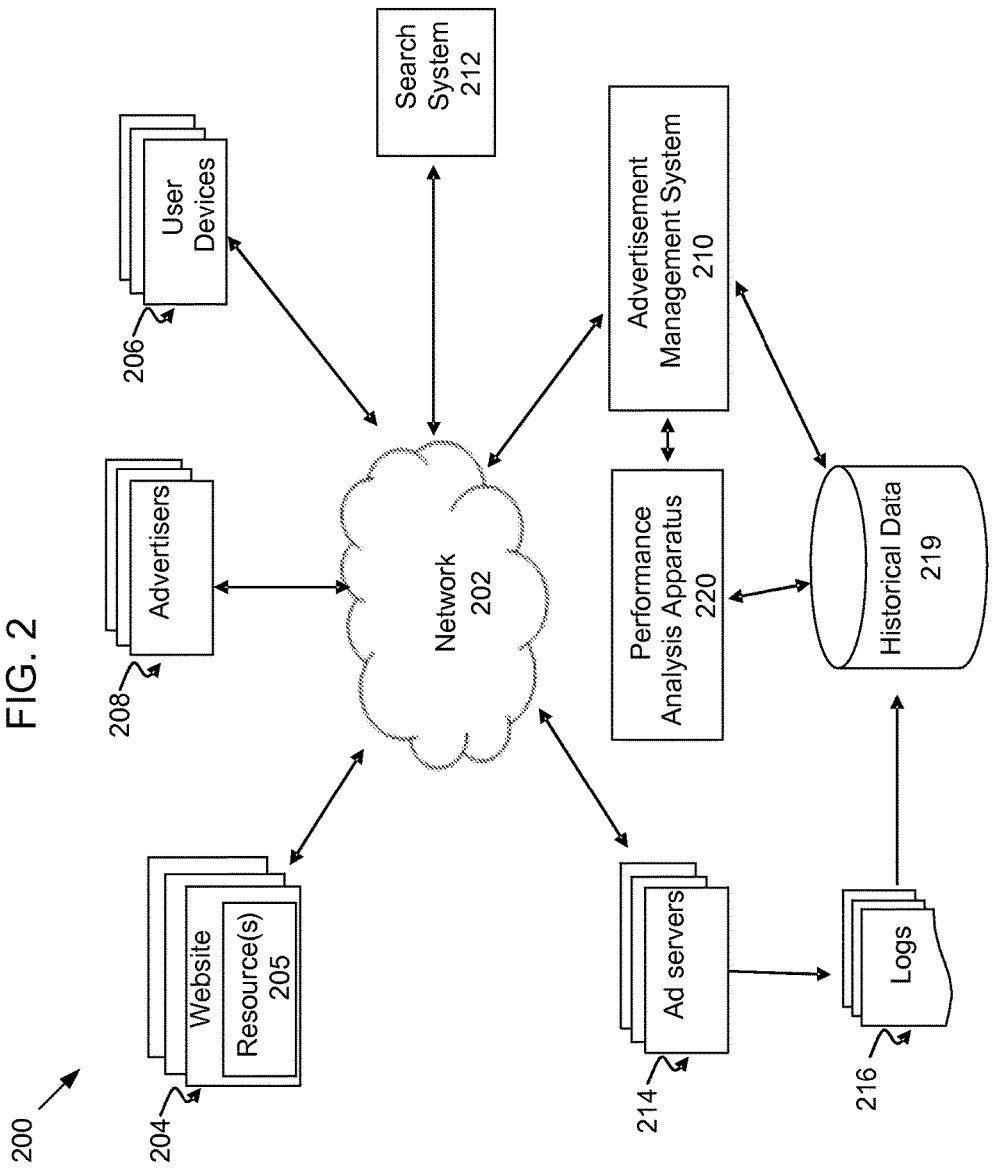
FIG. 2 is a block diagram of an example environment in which an advertisement management system manages advertising services, in accordance with an illustrative implementation.

FIG. 2 is a block diagram of an example environment 200 in which an advertisement management system 210 (which can include the ad mixer 110 of FIG. 1) manages advertising services in accordance with an illustrative implementation. The example environment 200 includes a network 202, such as a local area network (LAN), a wide area network (WAN), the Internet, or a combination thereof. The network 202 connects websites 204, user devices 206, advertisers 208, and an advertisement management system 210. The example environment 200 may include many thousands of websites 204, user devices 206, and advertisers 208.

A website 204 includes one or more resources 205 associated with a domain name and hosted by one or more servers. An example website is a collection of web pages formatted in hypertext markup language (HTML) that can contain text, images, multimedia content, or programming elements, such as scripts.

A resource 205 can include any data that can be provided over the network 202. A resource 205 can be identified by a resource address that is associated with the resource 205, such as a uniform resource locator (URL). Resources 205 can include web pages, word processing documents, portable document format (PDF) documents, images, video, programming elements, interactive content, and feed sources, to name only a few. The resources 205 can include content, such as words, phrases, images and sounds, that may include embedded information (such as metainformation in hyperlinks) and/or embedded instructions. Embedded instructions can include code that is executed at a user's device, such as in a web browser. Code can be written in languages such as JavaScript® or ECMAScript®.

A user device 206 is an electronic device that is under control of a user and is capable of requesting and receiving resources 205 over the network 202. Example user devices 206 include personal computers, mobile communication devices, and other devices that can send and receive data over the network 202. A user device 206 typically includes a user application, such as a web browser, to facilitate the sending and receiving of data over the network 202.

A user device 206 can request resources 205 from a website 204. In turn, data representing the resource 205 can be provided to the user device 206 for presentation by the user device 206. The data representing the resource 205 can include data specifying a portion of the resource or a portion of a user display (e.g., a presentation location of a pop-up window or in a slot of a web page) in which advertisements can be presented. These specified portions of the resource 205 or user display can be referred to as advertisement slots.

To facilitate searching of the vast number of resources 205 accessible over the network 202, the environment 200 can include a search system 212 that identifies the resources 205 by crawling and indexing the resources 205 provided on the websites 204. Data about the resources 205 can be indexed based on the resource 205 with which the data is associated. The indexed and, optionally, cached copies of the resources 205 are stored in a search index (not shown).

User devices 206 can submit search queries to the search system 212 over the network 202. In response, the search system 212 accesses the search index to identify resources 205 that are relevant to the search query. In one illustrative implementation, a search query includes one or more keywords. The search system 212 can identify the resources 205 that are responsive to the query, can provide information about the resources 205 in the form of search results and can return the search results to the user devices 206 in search results pages. A search result can include data generated by the search system 212 that identifies a resource 205 that is responsive to a particular search query, and can include a link to the resource 205. An example search result can include a web page title, a snippet of text or a portion of an image extracted from the web page 204, a rendering of the resource 205, and the URL of the web page 204. Search results pages can also include one or more advertisement slots in which advertisements can be presented.

A search result page or a content page can be sent with a request from the search system 212 for the web browser of the user device 206 to set an HTTP (HyperText Transfer Protocol) cookie. A cookie can represent, for example, a particular user device 206 and a particular web browser. For example, the search system 212 can include a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, subsequent web page requests to the same server or a server within the domain of the server can include the cookie. The cookie can store a variety of data, including a unique or semi-unique identifier. The unique or semi-unique identifier can be anonymized and not connected with user names. Because HTTP is a stateless protocol, the use of cookies allows an external service, such as the search system 212 or other system, store information over multiple sessions. A user may prevent such information storage, for example, by disabling cookies in the browser's settings.

When a resource 205 or search results are requested by a user device 206 or provided to the user device 206, the advertisement management system 210 includes at least one server, processor, or logic device configured to receive a request for advertisements to be provided with the resource 205 or search results. The request for advertisements can include characteristics of the advertisement slots that are defined for the requested resource 205 or search results page, and can be provided to the advertisement management system 210. For example, a reference (e.g., URL) to the resource 205 for which the advertisement slot is defined, a size of the advertisement slot, and/or media types that are available for presentation in the advertisement slot can be provided to the advertisement management system 210. Similarly, keywords (i.e., one or more words that are associated with content) associated with a requested resource 205 ("resource keywords") or a search query for which search results are requested can also be provided to the advertisement management system 210 to facilitate identification of advertisements that are relevant to the resource 205 or search query. In addition, various other data such as, but not limited to, keywords generated from online searches requested by a user can also be accessed by or provided to the advertisement management system 210.

Based on data included in the request for advertisements, the advertisement management system 210 can select advertisements that are eligible to be provided in response to the request. For example, eligible advertisements can include advertisements having characteristics matching the characteristics of advertisement slots and that are identified as relevant to specified user interests based upon information previously provided by the user (e.g., when a user registers onto a social network). In some implementations, advertisements having keywords that match a user's interests, the resource keywords, the search query, or portions of the search query are selected as eligible advertisements by the advertisement management system 210.

In other implementations, a user can opt in or opt out with respect to providing user specific information that may include user interests or the user's profile (e.g., male, between the age of 20 to 30, likes sports, etc.). In those implementations, the most popular advertisements are selected as eligible advertisements by the advertisement management system 210, whereby advertisements that match a search query or are relevant to content within web sites currently or recently visited by a user are selected as eligible advertisements.

The advertisement management system 210 can select an eligible advertisement for each advertisement slot of a resource 205 or of a search results page. The resource 205 or search results page can be received by the user device 206 for presentation by the user device 206. User interaction data representing user interactions with presented advertisements can be stored in a historical data store 219. For example, when an advertisement is presented to the user via an ad server 214, data can be stored in a log file 216. This log file 216 can be aggregated with other data in the historical data store 219. Accordingly, the historical data store 219 can contain data representing the advertisement impression. For example, the presentation of an advertisement is stored in response to a request for the advertisement that is presented. The ad request can include data identifying a particular cookie, such that data identifying the cookie can be stored in association with data that identifies the advertisement(s) that were presented in response to the request. In some implementations, the data can be stored directly to the historical data store 219.

Similarly, when a user selects (i.e., clicks) a presented advertisement, data representing the selection of the advertisement can be stored in the log file 216, a cookie, or the historical data store 219. In some implementations, the data is stored in response to a request for a web page that is linked to by the advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 206.

The log files 216, or the historical data store 219, can also store references to advertisements and data representing conditions under which each advertisement was selected for presentation to a user. For example, the historical data store 219 can store keywords, bids, and other criteria with which eligible advertisements are selected for presentation. Additionally, the historical data store 219 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation. In some implementations, the user can opt in or opt out with respect to including the user's personal information for selecting advertisements for presentation. That is, information regarding previous advertisements selected by the user can be omitted from the information stored in the historical data store 219 in these implementations.

Some implementations relate to a system and method for adjusting a quality score of an advertisement for consideration in an online auction, based on a user's browsing history. In one implementation, an adjustment of the quality score of an ad is computed by the advertisement management system 210 as a function of the user's clickiness. For example, a measure of the user's clickiness can be determined based on the number of clicks on ads made by a user in the last X hours or last Y days, or the number of ad impressions viewed by the user in the last X hours or Y days. This information can be used to adjust (increase or decrease) a quality score of an ad.

Figure 3:
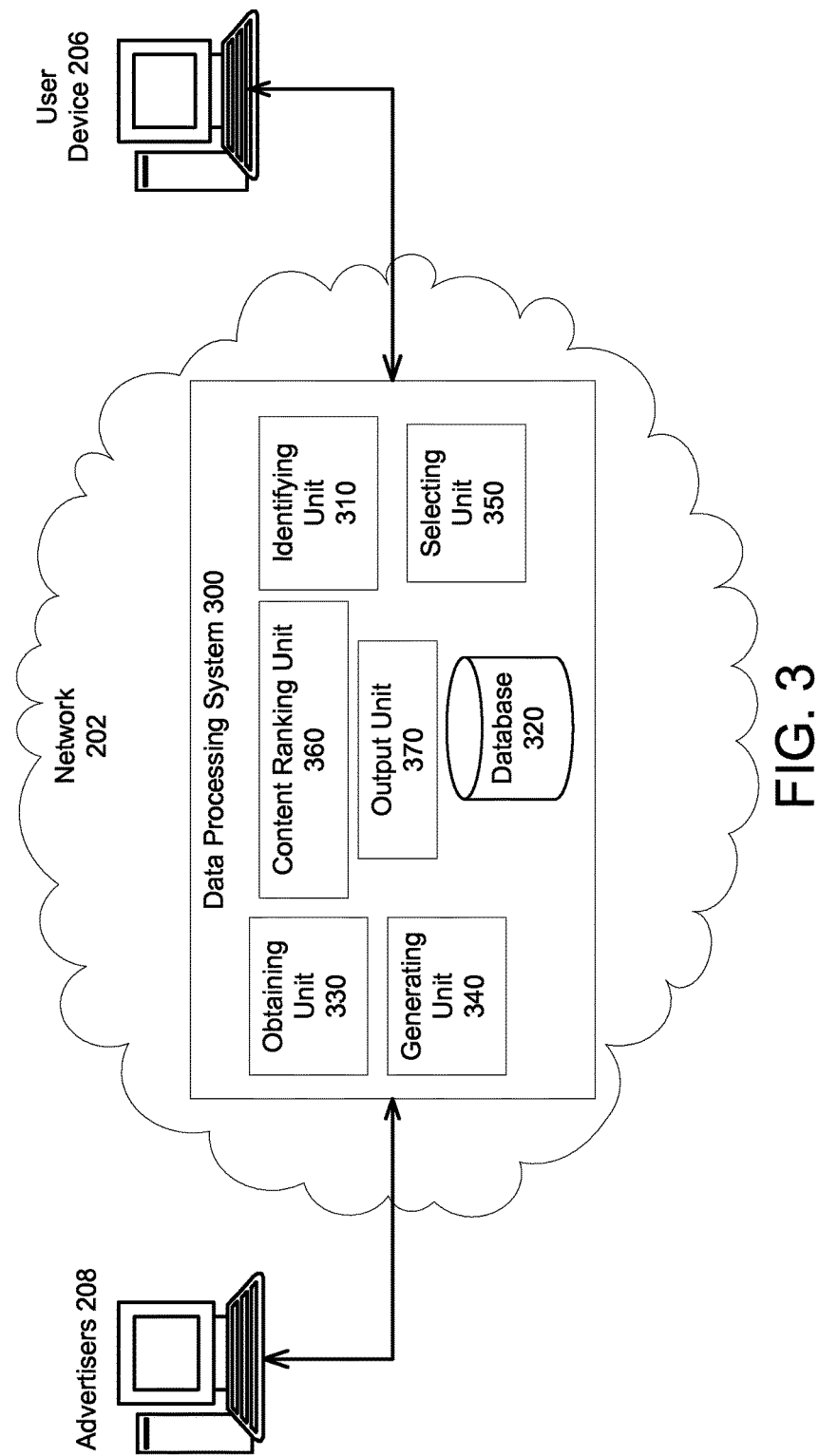
FIG. 3 is a block diagram showing elements for computing an adjusted quality score of advertisements to be considered in an advertisement auction, in accordance with an illustrative implementation.

FIG. 3 depicts a data processing system 300 for evaluating content on a computer network such as network 202. In some implementations, the data processing system 300 includes at least one server or computing device. In one implementation, the data processing system includes the advertisement management system 210 of FIG. 2. Referring now to FIG. 2 and FIG. 3, an identifying unit 310 of the advertisement management system 210 can record user actions made over a period of time, such as the last day, the last week, or the last two hours. These actions may include the user clicking on an advertisement provided on a web page currently being visiting by the user. The identifying unit 310 may obtain this information from the user's browser application by way of cookies output by the browser, for example. The identifying unit 310 can keep track of web sites visited by the user over the same period of time, and in particular, the identifying unit 310 can keep track of the number of advertisements that have been impressed to the user (e.g., shown to the user to thereby allow the user to click on those advertisements) over that same period of time. The identifying unit 310 may obtain this information from the user's browser by way of cookies output by the user's browser, for example.

The identifying unit 310 can identify a user metric based on the user's past browsing actions that, for example, corresponds to the user's clickiness for ads provided to the user. For example, if the user was provided with 75 advertisements during the past four days, and whereby the user clicked on 15 of those advertisements, then the identifying unit 310 determines that the user has a 15/75=20% probability of clicking on an advertisement impressed to the user, based on that historical data.

The identifying unit 310 also may have access to a database 320, which stores historical data of a plurality of users over a past time period, such as the click through rate or other clickiness indicator of hundreds of users over the past year, in order to determine a baseline clickiness of online users. That way, a determination can be made as to whether the 20% clickiness ratio of the current user, for example, makes that user more likely or less likely than the typical user to click on an advertisement presented to the user on a web page currently being visited by the user.

An obtaining unit 330 of the advertisement management system 210 can obtain a quality score of content configured for display with a web page. The quality score can be based at least in part on keywords associated with the content and at least one of a term of a search query and metadata associated with the web page. For example, the advertisement management system 210 computes a quality score for each candidate ad stored in the ad shards 120 of FIG. 1, based on the closeness of the keywords associated with each of the candidate ads and the keywords associated with an online search request made by a user, or based on the closeness of metadata associated with a publisher's web page (for which ads are to be displayed) currently visited by the user and the keywords associated with each of the candidate ads.

Based on user clickiness metric as output by the identifying unit 310 and the quality score obtained by the obtaining unit 330, an adjusted quality score can be computed by a generating unit 340 of the advertisement management system 210. In some implementations, the adjusted quality score is used to determine whether an ad auction will be based more on ad quality (and less on an ad bid value); or less on ad quality (and more on an ad bid value). For example, if the database 320 stores information indicating that the normal online user clicks on 10% of the advertisements impressed to the online user, then the 20% value computed for the current user makes that user to be considered as a "clicky" user who tends to click on advertisements more than the normal user.

A selecting unit 350 of the advertisement management system 210 can select a parameter for an auction based on the adjusted quality score computed by the generating unit 340, in which the parameter indicates a ratio of a bid value based auction and a content quality based auction. As such, the selecting unit 350 can adjust the advertisement computation value for each advertisement to weigh more heavily towards cost-per-click assigned to an advertisement as opposed to a quality score assigned to the advertisement, since that user is likely to click on an advertisement impressed to the user no matter the relevance of that advertisement to the user's current interests.

In one implementation, a content ranking unit 360 of the advertisement management system 210 determines a content ranking of the content based on the adjusted quality score and a bid value associated with the content. For example, the content ranking unit 360 can rank an ad or other content as being primarily suitable for a bid based auction, where placement of the content with a web page is primarily based on the content associated with the highest bid value. The content ranking unit 360 can also rank the content as being primarily suitable for a quality based auction, where the quality of the ad is the predominate factor in whether or not the ad will win the auction to be placed on a web page.

In some implementations, at least one output unit 370 provides the adjusted quality score to an auction computation apparatus, which may correspond, for example, to the ad mixer 110 of FIG. 1, which performs an ad auction based on the adjusted quality score.

In one example, the data processing system 300 can assign an equal weight to the quality score of a candidate advertisement and the cost-per-click (e.g., monetary value) assigned to a candidate advertisement. For example, if a first candidate advertisement has a quality score equal to 7 (e.g., a value between 1 and 10 that is computed by the data processing system 300 based on the relevance of keywords of an online search requested by a user as compared to keywords assigned to the candidate advertisement by the advertiser) and a monetary value equal to 5 (e.g., 5 cents per click to be paid by the advertiser), the first candidate advertisement has an advertisement auction value equal to 7±5=12.

In this same example, if a second candidate advertisement has a quality score equal to 5 and a monetary value equal to 6.5 (e.g., 6.5 cents per click to be paid by the advertiser), the second candidate advertisement has an advertisement auction value equal to 5±6.5=11.5. As such, with equal weighting being assigned to the quality score portion of a candidate advertisement and to the monetary value (e.g., cost-per-click) of the candidate advertisement, the first candidate advertisement has a higher advertisement auction value and would win an auction in which only the first and second candidate advertisements participated in.

Now, assume that, based on the user's clickiness as determined by the identifying unit 310, that user is determined to be more likely than the average online user to click on advertisements. As such, in the above example, since the user is considered to be more interested in ads for ads sake than in the quality of ads, the monetary value assigned to candidate advertisements is weighted more heavily than the quality score assigned to the candidate advertisements. For example, if an online user has a clickiness ratio computed to be 20% by the identifying unit 310 and the average online user has a clickiness ratio of 10% (based on information stored in the database 320), the selecting unit 350 may select a weight of 10 for the monetary value portion of a candidate advertisement and a weight of 1 for the quality score portion of the candidate advertisement to reflect the user's clickiness.

In that case, the first candidate advertisement will have an adjusted advertisement auction score of (7*1)+(5*10)=0.7+50=57, and the second candidate advertisement will have an adjusted auction score of (5*1)+(6.5*10)=5+65=70. Based on the adjusted ad auction scores, the second candidate advertisement will win the advertisement auction caused by an action of a more-clickier-than-normal online user, which is not the case when the weighting was equal between the quality score portion and the monetary value portion assigned to each candidate advertisement.

In a similar manner, if a user's online actions indicate that the online user is less likely to click on an advertisement than a typical online user, then the user is considered to be more interested in the quality of ads than the typical online user and, and the quality score assigned to the candidate advertisements is weighted more heavily than the monetary value assigned to candidate advertisements when performing an advertisement auction based on a user action. Continuing with the above example having first and second candidate advertisements competing in an ad auction that only allows one ad to be impressed to the user, the selecting unit 350 may select a weight of 1 for the monetary value portion of a candidate advertisement and a weight of 10 for the quality score portion of the candidate advertisement to reflect the user's lesser amount of clickiness as compared to the typical online user.

In that case, the first candidate advertisement will have an adjusted advertisement auction score of (7*10)+(5*1)=70+5=75, and the second candidate advertisement will have an adjusted auction score of (5*10)+(6.5*1)=50±6.5=56.5. Based on the adjusted auction scores, the first candidate advertisement will win the advertisement auction caused by an online action of a less-clickier-than-normal online user.

As explained above, an ad quality score adjustment is performed in accordance with one or more implementations based on the premise that users who clicked less on ads impressed to them are more sensitive to the quality of the ad (e.g., they are discriminating users), while users who click a lot on ads impressed to them are less sensitive to the quality of ad (e.g., they will click on most anything). Therefore, for the users who click less, the ad placement system may run a primarily quality-based auction, which gives increased importance to selecting the highest quality ad, and the weightings provided to candidate ads by the ad mixer reflect the higher importance to be assigned to the quality of ads. For the users who click a lot, the ad placement system may run a primarily bid-based auction, which gives increased importance to selecting the ad having the highest bid value, and the weightings provided to candidate ads by the ad mixer reflect the higher importance to be assigned to the monetary value assigned to candidates ads by advertisers.

In some implementations, the adjusted quality score can be a function of the pre-adjusted (or initial) quality score, user clicks, user impressions, or other features, and can be represented as:

$$\text{Adjusted-quality-score} = f(\text{quality-score}, \text{user-clicks}, \text{user-impressions}, \text{other user features})$$

In at least one implementation, the function f( ) can be learned from a logistic regression trained on the tuples: click, quality-score, user-clicks, user-impressions, other-user-features. The element "click" indicates whether the user clicked on that advertisement shown in that impression. The element "other-user-features" can include the user country, for example. That way, based on historical data obtained from other users in the same user country, the current user can be determined to be more or less clicky than the typical user from that user country, and the candidate advertisement score can be computed using an adjusted quality score to reflect that information.

The element "quality-score" can represent the quality score before the adjustment (i.e., before applying the features of this disclosure). The element of "user-clicks" can be the number of clicks made by user in the last X hours or Y days (where X and Y are real numbers). The element "user-impressions" can be the number of impressions viewed by a user in the last X hours or Y days. The logistic regression analysis can be used to determine the adjusted quality score, or to determine the factor by which the quality score is adjusted.

Linear regression analysis can be utilized to model the relationship between two or more variables and a response variable by fitting a linear equation to observed data. In one or more implementations, the variables quality-score, user-clicks, user-impressions, other user features are input to a linear regression model of the generating unit 340 of FIG. 3, in order to obtain an adjusted-quality-score to be utilized for an advertisement auction that is to be performed based on an online user action (e.g., a user visiting a particular web site that allows ads to be shown, or a user requesting an online search using keywords entered by the user).

In other implementations, the adjusted-quality-score function can be computed by the generating unit 340 of FIG. 3 using a spline, in which a smooth piecewise-polynomical function is computed from the variables quality-score, user-clicks, user-impressions, other user features to obtain the adjusted quality score for any particular n-tuple of those values.

In one or more implementations, the adjusted quality score is computed by the generating unit 340 of FIG. 3 by using non-linear techniques, such as the linear regression techniques and the spline techniques described above. In other implementations, which provide a simpler computation process, linear techniques can be used to compute the adjusted quality score and thereby the advertisement auction ranking value for a candidate advertisement.

Figure 4:
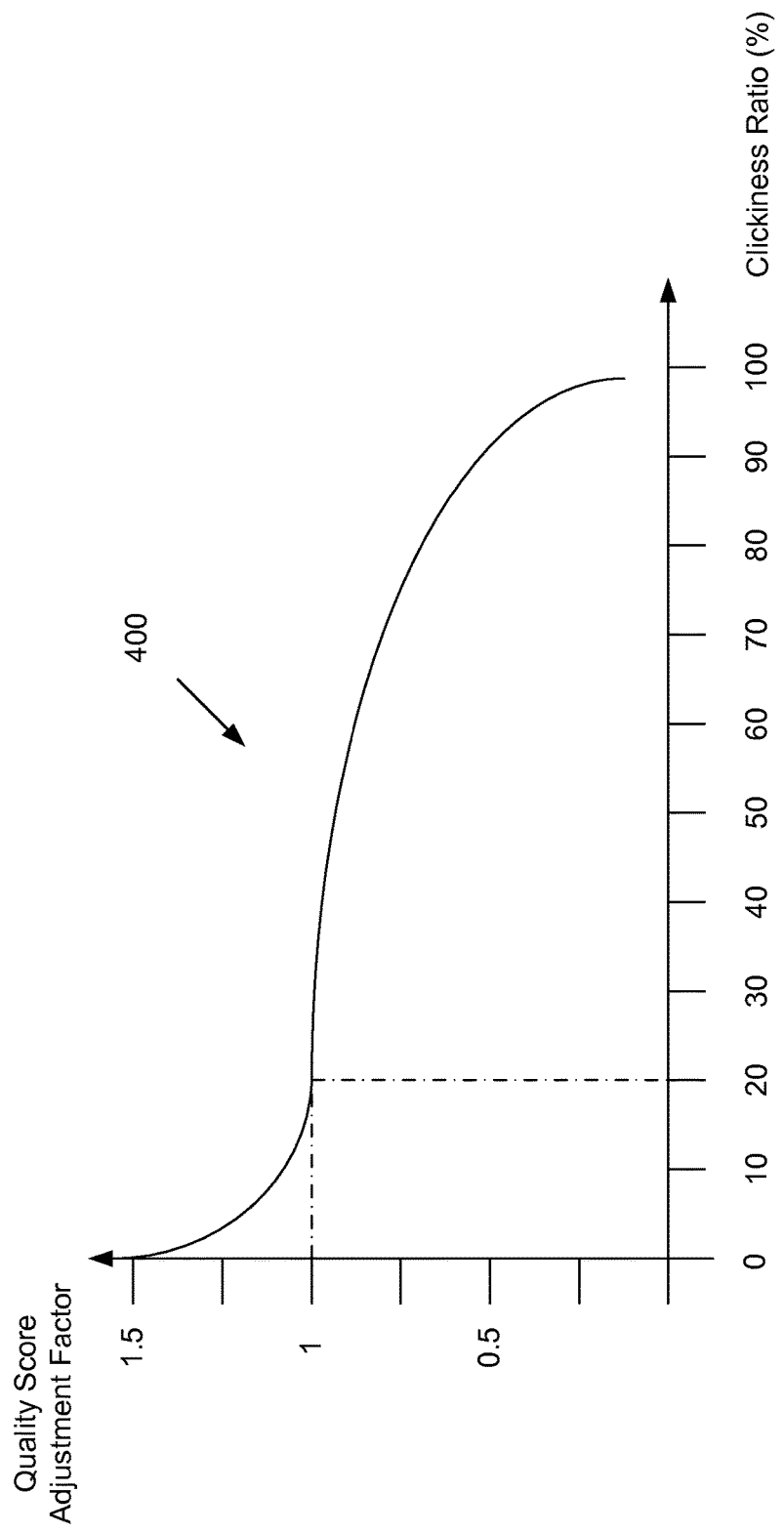
FIG. 4 is a plot of adjusted quality score value versus user ad clickiness percentage, in accordance with an illustrative implementation.

FIG. 4 shows an example plot 400 of an adjusted quality score weighting factor as a function of relative clickiness of an online user with respect to a "normal" online user. In FIG. 4, the normal online user has a clickiness value of 20%, based on information stored in a database 320 (see FIG. 3), and so that the normal online user has a quality score adjustment factor equal to one (1), signifying no adjustment is to be made to the quality score. In the example depicted in FIG. 4, clickiness percentages less than 20% are given a quality score adjustment factor less than one, and clickiness percentages greater than 20% are given a quality score adjustment factor greater than one. That is, online users who tend to click on ads less often than the normal online user have ads to be considered in ad auctions caused by their online actions weighted more heavily on ad quality, whereas online users who tend to click on ads more often than the normal online user have ads to be considered in ad auctions caused by their online actions weighted more heavily on an ads monetary value (e.g., the cost-per-click assigned by an advertiser for having his/her ads considered in ad auctions). The shape of the plot 400 shown in FIG. 4 can be obtained by regression techniques or spline techniques on historical online user ad click data, for example.

In some implementations, the quality score is adjusted by the generating unit 340, and the monetary value assigned to each candidate ad as obtained from the ad shards 110 remains the same. Using the same example as described previously, if the first candidate advertisement has a quality score equal to 7 and a monetary value equal to 5, based on a user clickiness of 20% being twice as much as a normal online user, the quality score can be adjusted to 0.7 (e.g., 7*0.1 weighting value), to reflect the lesser importance to be assigned to a quality score for clicky users. The advertisement ranking value of the first candidate advertisement is thus computed as 0.7+5=5.7. If the second candidate advertisement has a quality score equal to 5 and a monetary value equal to 6.5, based on the same clicky user, the quality score is adjusted to 0.5, and the advertisement (or other content) ranking value of the second candidate advertisement is thus computed to be 0.5+6.5=7.0, whereby the second candidate advertisement will outrank the first candidate advertisement for auctions caused by this clicky user in this example.

In some implementations, the advertisement ranking is determined by the data processing system 300 of FIG. 3 based on multiplying the quality score value and the monetary value assigned to each candidate advertisement (as opposed to adding those two values as described above with respect to one or more implementations). In these implementations, a non-linear adjustment of the quality score value can be performed for each candidate advertisement based on the relative clickiness or non-clickiness of each online user that causes an online auction to be performed, and whereby advertisements are deemed to have won or lost an advertisement auction accordingly. By way of example, using the same exemplary first and second candidate advertisements described previously, the first candidate advertisement will have its quality score adjusted from 7 to 3, and the second candidate advertisement will have its quality score adjusted from 5 to 2.5. As such, prior to quality score adjustment, the first candidate advertisement had a ranking value of 7*5=35, and the second candidate advertisement had a ranking value of 5*6.5=32.5; and after quality score adjustment, the first candidate advertisement had a ranking value of 3*5=15 and the second candidate advertisement had a ranking value of 2.5*6.5=16.25, thereby switching the relative rankings of these two advertisements for an online auction caused by a relatively clicky user.

Figure 5:
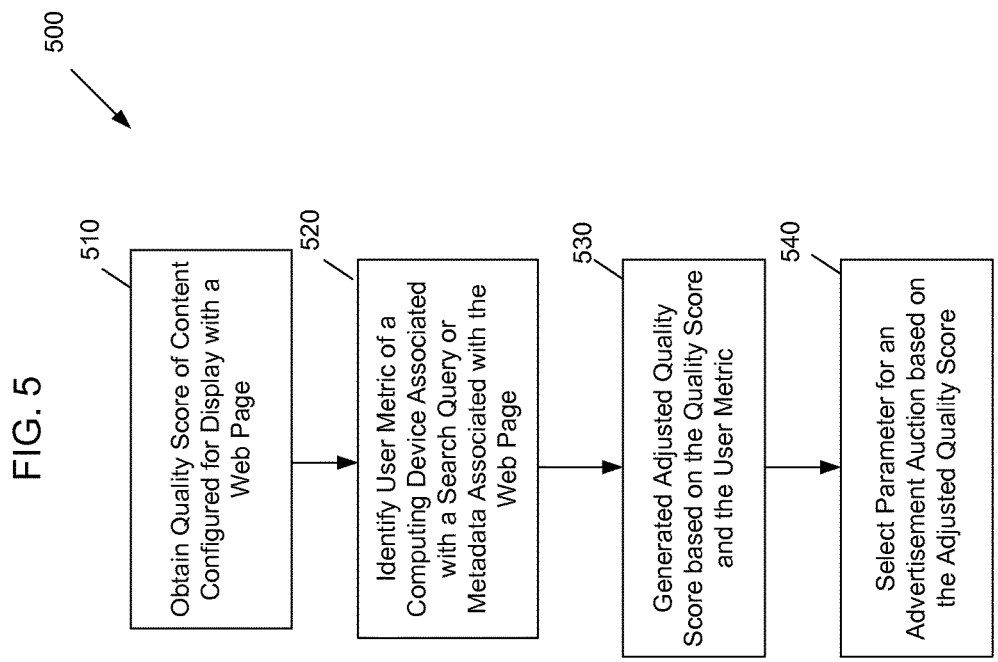
FIG. 5 is a flow diagram showing acts in a method for computing an adjusted quality score of advertisements to be considered in an advertisement auction, in accordance with an illustrative implementation.

FIG. 5 illustrates a method 500 for evaluating content on a computer network, such as candidate advertisements for inclusion on a web page currently being visited by an online user, in accordance with some implementations.

In one implementation, the method 500 obtains a quality score of content configured for display with a web page (BLOCK 510). For example, the obtaining circuit can receive the quality score of content from the ad shards via the network. The obtained quality score (BLOCK 510) can indicate the quality of a match between keywords corresponding to an ad (or other content) and at least one of a term of a search query. In some implementations, the obtained quality score (BLOCK 510) indicates the quality of a match between ad keywords and metadata associated with the web page (as obtained from the user's browser), or other information such as the subject matter of the web page.

The method 500 can also identify a user metric of a computing device associated with the at least one of the search query and the metadata associated with the web page (BLOCK 520). For example, the identifying unit can determine a user metric indicating the level of clickiness of the online user as compared to a threshold, e.g., click through rates of typical online users.

In some implementations, the method 500 generates an adjusted quality score of the content (BLOCK 530). For example, the adjusted quality score can be generated (BLOCK 530) by the generating unit 340 of the data processing system based on the quality score and the user metric. The method 500 can also select a parameter for an advertisement auction (BLOCK 540). For example, the parameter can be selected (BLOCK 540) by the selecting unit 350 of the data processing system. In one implementation, the parameter is selected (BLCOK 540) based on the adjusted quality score to indicate a ratio of (or mix between) a bid value based auction and a content quality based auction. As described above with respect to one or more implementations, the parameter can be based on a first weight assigned to a monetary value portion of a candidate advertisement and a second weight can be assigned to a quality score value portion of the candidate advertisement that is being considered in an advertisement auction. The parameter can indicate that the ad or other content configured for display with a web page is better suited for a bid based or quality based auction.

Figure 6:
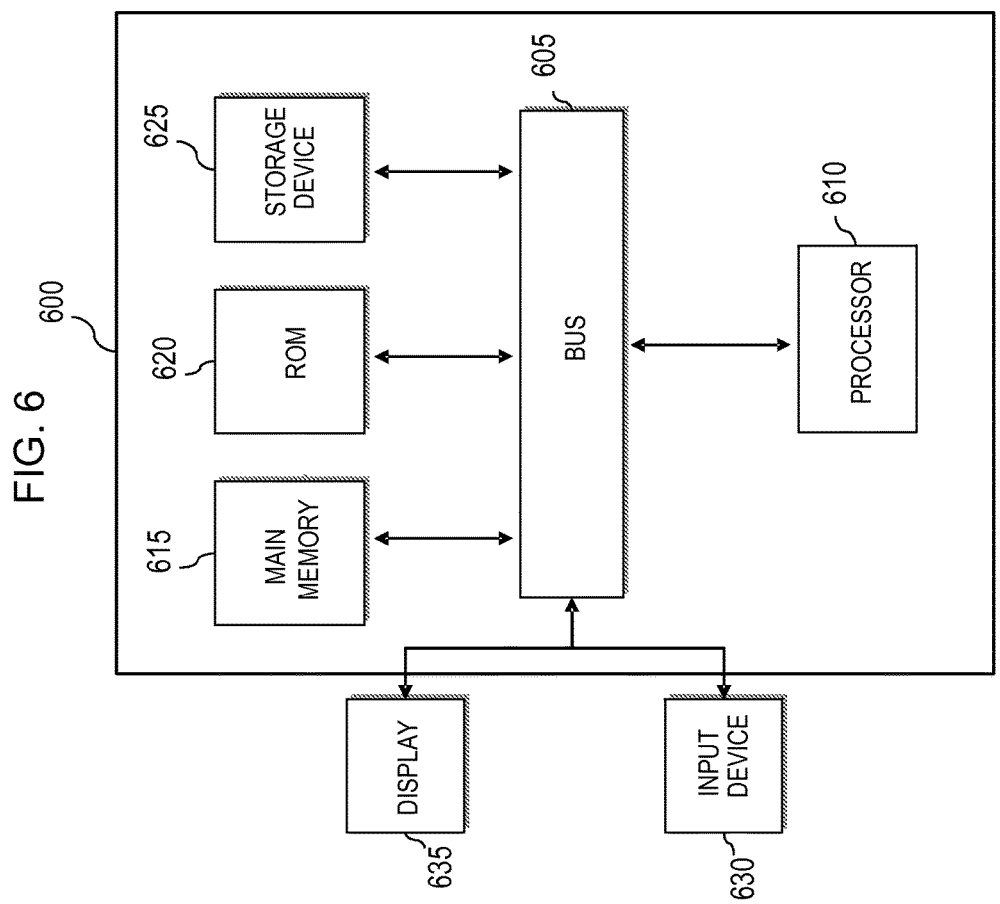
FIG. 6 is a block diagram of a computer system in accordance with an illustrative implementation.

FIG. 6 is a block diagram of a computer system or computing device 600 in accordance with an illustrative implementation. The computer system or computing device 600 can be used to implement method 500, or the user device 206. In one implementation, the data processing system 300 includes the computing device 600. The computing system 600 includes a bus 605 or other communication component for communicating information and a processor 610 coupled to the bus 605 for processing information. The computing system 600 also includes main memory 615 (also referred to herein as a computer readable storage medium, which does not include transitory signals), such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various implementations, the processes described herein can be implemented by the computing system 600 in response to the processor 610 executing an arrangement of instructions contained in main memory 615. Such instructions can be read into main memory 615 from another computer-readable storage medium, such as the storage device 625, in which the computer-readable storage medium does not include transitory signals. Execution of the arrangement of instructions contained in main memory 615 causes the computing system 600 to perforin the illustrative processes described herein. One or more processors in a multi-processing arrangement may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A method of evaluating content on a computer network, comprising:
    identifying, by a data processing system, a quality score of content configured for display with a resource;
    identifying a user metric of a computing device based on activity of the user;
    generating an adjusted quality score of the content based on the quality score and the user metric;
    selecting a parameter for an auction based on the adjusted quality score, the parameter indicating a normalized ratio between a bid value-based auction and a content quality-based auction;
    adjusting, by the data processing system, weightings provided to candidate content items to reflect the normalized ratio between the bid value-based auction and the content quality-based auction, including:
        increasing the weightings provided to the candidate content items for the bid value-based auction if the user metric indicates a threshold amount of user activity; and
        decreasing the weightings provided to the candidate content items for the bid value-based auction if the user metric indicates less than a threshold amount of user activity;
    performing an auction using the parameter to determine selection of content including determining a content item to serve for rendering in a content slot of the resource; and
    serving the content item for rendering in the content slot of the resource based on the auction.

2. The method of claim 1, further comprising:
    determining a content ranking of the content based on the adjusted quality score and a bid value associated with the content.

3. The method of claim 2, further comprising:
    determining the content ranking by multiplying the adjusted quality score and the bid value associated with the content.

4. The method of claim 1, further comprising:
    executing the auction as a combination of a bid value based auction and a content quality based auction based on the adjusted quality score.

5. The method of claim 1, further comprising:
    determining the user metric based on at least one of a number of times the computing device has clicked on content during a predetermined time period, a number of impressions displayed by the computing device, or a location of the computing device.

6. The method according to claim 1, further comprising:
    generating the adjusted quality score based on logistic regression analysis.

7. The method according to claim 1, further comprising:
    generating the adjusted quality score by applying a non-linear function to the quality score.

8. The method of claim 1, wherein the user metric comprises a ratio of a first click-through rate associated with the user and a second click-through rate associated with other users.

9. A computer readable storage medium storing a computer program product which, when executed by a computer, causes the computer to perform functions of:
    identifying a quality score of content configured for display with a resource;
    identifying a user metric of a computing device based on activity of the user;
    generating an adjusted quality score of the content based on the quality score and the user metric; and
    selecting a parameter for an auction based on the adjusted quality score, the parameter indicating a normalized ratio between a bid value-based auction and a content quality-based auction;
    adjusting weightings provided to candidate content items to reflect the normalized ratio between the bid value-based auction and the content quality-based auction, including:
        increasing the weightings provided to the candidate content items for the bid value-based auction if the user metric indicates a threshold amount of user activity; and
        decreasing the weightings provided to the candidate content items for the bid value-based auction if the user metric indicates less than a threshold amount of user activity;
    performing an auction using the parameter to determine selection of content including determining a content item to serve for rendering in a content slot of the resource; and
    serving the content item for rendering in the content slot of the resource based on the auction.

10. The computer readable storage medium of claim 9, further comprising causing the computer to perform the function of:
   determining a content ranking of the content based on the adjusted quality score and a bid value associated with the content.

11. The computer readable storage medium of claim 10, wherein the content ranking is determined by multiplying the adjusted quality score and the bid value associated with the content.

12. The computer readable storage medium of claim 9, further comprising causing the computer to perform the function of:
   providing the adjusted quality score to an auction computation circuit.

13. The computer readable storage medium of claim 9, further comprising causing the computer to perform the function of:
   executing the auction as a combination of a bid value based auction and a content quality based auction based on the adjusted quality score.

14. The computer readable storage medium of claim 9, further comprising causing the computer to perform the function of:
   determining the user metric based on at least one of a number of times the computing device has clicked on content during a predetermined time period, a number of impressions displayed by the computing device, or a location of the computing device.

15. The computer readable storage medium of claim 9, wherein the adjusted quality score is generated based on logistic regression analysis.

16. The computer readable storage medium of claim 9, wherein the adjusted quality score is generated by applying a non-linear function to the quality score.

17. A system comprising:
   at least one processor operably coupled to at least one memory and configured to:
      identify a quality score of content configured for display with a resource;
      identify a user metric of a computing device based on activity of the user;
      generate an adjusted quality score of the content based on the quality score and the user metric; and
      select a parameter for an auction based on the adjusted quality score, the parameter indicating a normalized ratio between a bid value-based auction and a content quality-based auction;
      adjust, by the data processing system, weightings provided to candidate content items to reflect the normalized ratio between the bid value-based auction and the content quality-based auction, including:
         increase the weightings provided to the candidate content items for the bid value-based auction if the user metric indicates a threshold amount of user activity; and
         decrease the weightings provided to the candidate content items for the bid value-based auction if the user metric indicates less than a threshold amount of user activity;
      perform an auction using the parameter to determine selection of content including determining a content item to serve for rendering in a content slot of the resource; and
      serve the content item for rendering in the content slot of the resource based on the auction.

18. The system of claim 17, wherein the at least one processor is further configured to determine a content ranking of the content based on the adjusted quality score and a bid value associated with the content.

* * * * *